March 26, 1963 S. E. PETERSON 3,082,806
SEED POTATO CUTTING MACHINE

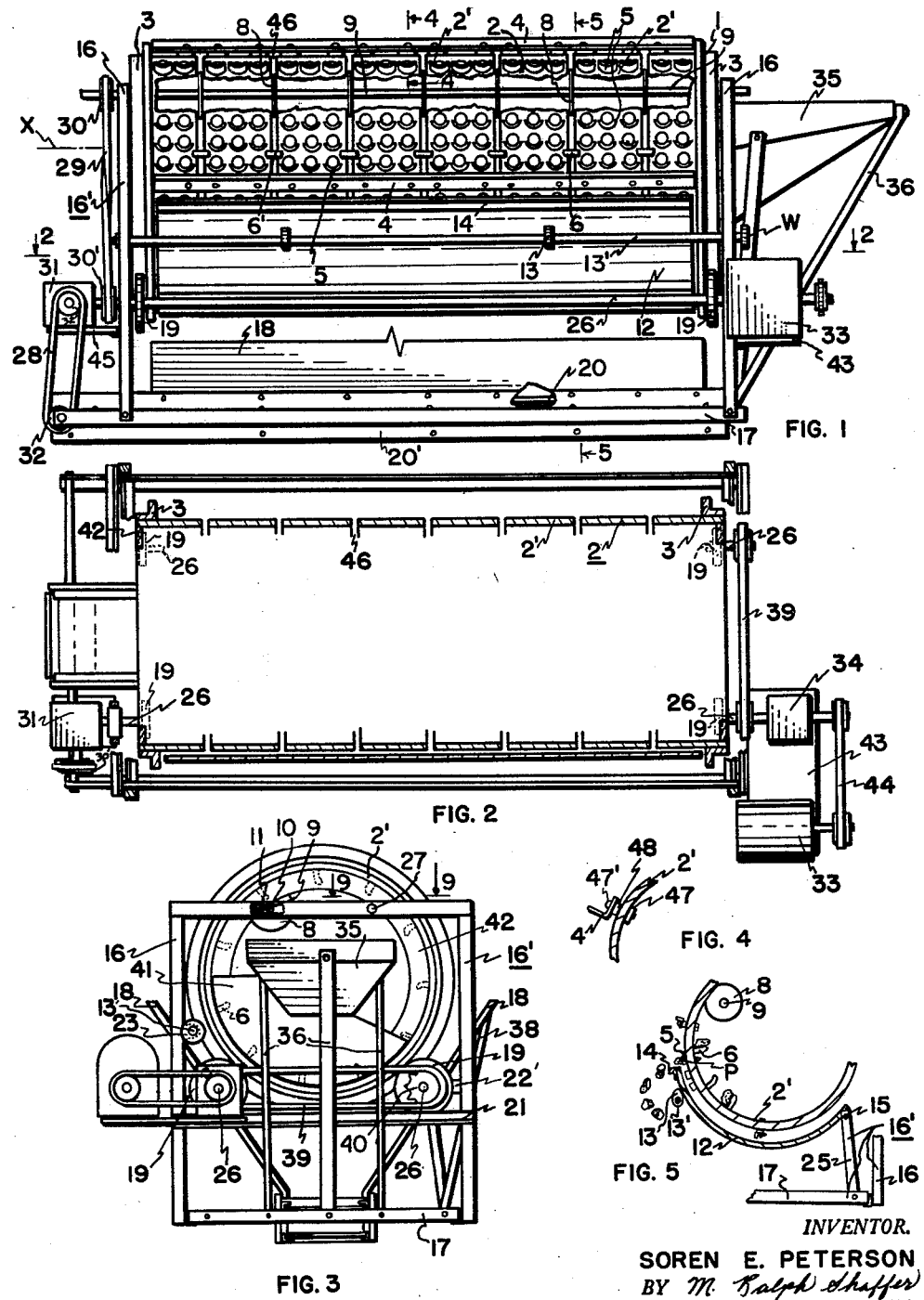

Filed Sept. 8, 1959 2 Sheets-Sheet 2

*INVENTOR.*
SOREN E. PETERSON
BY *M. Ralph Shaffer*
HIS ATTORNEY

3,082,806
SEED POTATO CUTTING MACHINE
Soren E. Peterson, 2689 S. 3rd East, Salt Lake City, Utah
Filed Sept. 8, 1959, Ser. No. 838,808
10 Claims. (Cl. 146—93)

This invention relates generally to machines for cutting vegetables and, more particularly, to a new and improved machine of the type described which is particularly adapted for cutting potato seed in an optimum manner preparatory to planting thereof.

The basic object of the invention is to provide a vegetable cutting machine which is more versatile than those hitherto devised, and which may be made fully automatic if desired.

A further object of the present invention is to provide a machine of the type described which will process a load of potatoes so as to eject pieces or "seed" thereof of a proper size; the principal operation of the machine takes cognizance of the fact that long, slender potatoes, though smaller in diameter than the screen size of the employed barrel, must be cut two or three times rather than merely once.

A further object of the invention is to provide a vegetable cutting machine wherein properly sized pieces are automatically ejected, with the remainder (including the long, thin pieces) being "balanced" and returned for further cutting.

An additional object is to provide a machine of the type described wherein the cutting means is disposed out of the load area and wherein finger conveying means are supplied for conveying suitably sized feed to the cutters of the machine.

The features of the present invention which are believed to be novel are set forth with particularity in the appended claims. The present invention, both as to its organization and manner of operation, together with further objects and advantages thereof, may best be understood by reference to the following description, taken in connection with the accompanying drawings in which:

FIGURE 1 is a side elevation, partially broken away at two areas for convenience of illustration, of the basic machine of the invention.

FIGURE 2 is a horizontal section taken along the line 2—2 in FIGURE 1.

FIGURE 3 is an elevation of the feed end of the structure shown in FIGURE 1.

FIGURE 4 is an enlarged, fragmentary view taken along the line 4—4 in FIGURE 1.

FIGURE 5 is a fragmentary, transverse section taken along the line 5—5 in FIGURE 1, showing the barrel screen and belly plate thereunder, supported by frame structure, illustrating how the belly plate of the machine keeps long, thin potatoes within the barrel screen until the cups of the screen are able to balance these potatoes and ultimately permit them to re-enter the screen's interior.

Figure 9:
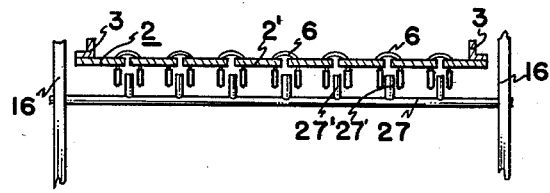

FIGURE 9 is a fragmentary section of reduced scale, rotated 90° in a counterclockwise direction and taken along the line 9—9 in FIGURE 3, showing the cleaning bar, barrel screen sections (in section), U-frames, and finger means, and illustrates the manner in which the cleaning bar of the machine cooperates with the finger means thereof in removing portions of cut potatoes which may be lodged in between the finger pair of the several finger means.

In the drawings and particularly in FIGURE 1, 1 designates the complete machine comprising the potato seed cutter. This machine may be disposed on a two-wheel trailer and used throughout an entire farm community, and can be operated at a cost which all farmers will be able to afford.

A principal component of the machine 1 is a barrel screen 2 which preferably takes the form of a plurality of cylindrical, barrel screen sections 2', disposed in registry with each other but are spaced apart and secured together by means of a set of angle iron braces 4.

The particular manner of attachment of the angle iron braces 4 to the several barrel screen sections 2' is best illustrated in FIGURES 1 and 4. Such securement is made by bolt attachment means 47', spacers 48 and the bolt holes 47 disposed at selected points along the several barrel screen sections 2'.

Welded or otherwise affixed to the outer margins of the outer barrel screen sections 2' are cylindrical, angle iron tracks 3 which ride upon rollers 19. The rollers 19 may simply comprise respective discs which are mounted upon roller shafts 26, the latter being journaled within frame 16' by means of bearings (not shown). Thus, preferably there are employed at least four rollers 19, with a pair of rollers 19 being disposed upon opposite ends of respective roller axles 26 (the latter are two in number). Other means might be employed for rotating the barrel screen 2.

The frame structure 16' of the machine basically includes a rectangular base frame 17 and a pair of inverted, U-shaped frame members 16 disposed at either end thereof. Affixed to the right hand frame member 16 is a motor mount 43 to which the motor or power plant 33 is mounted. Gear reduction box 34 is also proximately mounted upon mount 43 with the motor 33 and belt 44 interconnecting the two; thus, the gear reduction box ultimately drives roller 19 by means of roller drive sprockets 40 (affixed to axles 26), by roller drive chain 39 enveloping sprockets 40, with the left hand roller 19 being directly connected to left hand sprocket 40 (through common shaft 26) associated with the gear reduction box 34.

By virtue of the direct connection of roller shafts 26 to the drive, all four rollers 19 will rotate in a uniform manner. Additionally, and as shown in FIGURE 1 the roller shaft 26 nearest the viewer is coupled through a gear box 31 to conveyor sprockets 32, by drive means 28, so as to drive the conveyor 20, of conventional design, which is connected thereto in a usual manner.

Rigidly secured to conveyor structure 20' (or alternatively, to the frame 16') are a pair of trough plates 18 which confine the conveyor area for potato cuttings.

Hopper 35 is secured to the frame 16' by conventional means (not shown) and includes a plurality of hopper brace supports 36 as illustrated in FIGURES 1 and 3. Thus, potatoes or other vegetables which are desired to be cut are introduced into the hopper 35 which in turn directs the potatoes into the interior of barrel screen 2.

Additional braces 21, 22 and 22' (broken away), journalling shafts 26, and 45 complete the bracing for the frame structure 16'.

Figure 7:
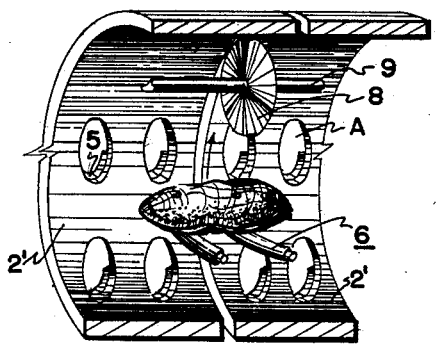
FIGURE 7 is a detail of a portion of the interior of the barrel screen of the machine, illustrating the manner in which the finger means, connected across two adjacent barrel sections thereof convey potatoes from the load up to the cutting blades of the machine.
Figure 6:
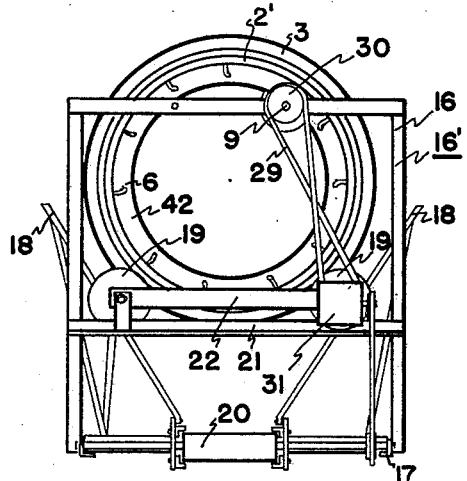
FIGURE 6 is an elevation of the left end of the machine.

It will be noted especially with reference to FIGURE 1 that each of the barrel sections 2' of the barrel screen 2 is provided with a multiplicity of side apertures A (see FIGURE 7). Exteriorly disposed with respect to these apertures and in registry therewith at the bottom area thereof are a respective multiplicity of cups 5 which are fabricated from strap material, for example, and are formed to delineate, preferably, from one-half to three-fourths of the periphery of each aperture A. The purpose of the inclusion of these cups is to "balance," and thereby conduct, the small, long potatoes or small, long potato pieces past the ejection area of the barrel screen so that these potatoes or pieces will drop back into the load within the barrel screen 2. This phenomenon will be described more fully hereinafter.

Journalled within the two inverted U-shaped frame members 16 by means of a pair of end bushings 10 supplied with relief springs 11 is the knife shaft 9. Mounted upon knife shaft 9 are a plurality of cutting blades 8 which, as shown, may take the form of discs. The power plant 33 may, if desired, drive knife shaft 9 by means of pulleys 30 and 30' and crossed belt 29; thus, the rotation of the blades will be such that the cutting will be one of shearing nature in a direction reverse to that of barrel screen rotation.

Figure 8:
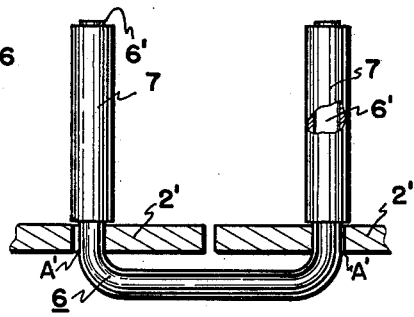
FIGURE 8 is an elevation of a representative finger means of the invention, with one sleeve being broken away and sectioned, for convenience of illustration, and with adjacent barrel screen sections also being shown in section and in fragmentary view.

Also affixed to frame member 16 is a cleaning bar 27 having a plurality of protuberances 27' which register in between the fingers 6' of finger members 6. As shown, the finger member 6 may preferably take the form of U-configured elements having the respective fingers 6'. Mounted upon fingers 6' are protective rubber sleeves 7. Rubber sleeves 7 are illustrated in FIGURE 8.

The sleeves serve to protect the potatoes in the load from damage due to the travel of the fingers 6 by virtue of barrel sleeve revolvement. Preferably, the finger members 6 will be fabricated from spring steel. Thus, the finger members may be disposed into their respective finger access apertures A' (see FIGURE 8) and be retained in place suitably thereby.

An important feature of the invention consists in the provision of a belly plate or baffle means 12 which is hingedly or otherwise connected to the frame structure 16' at brace 25 thereof, by suitable means 15. It may be fabricated from a suitable, sufficiently thin material so as to be capable of slight deformation if desired. It should extend up the "up-motion" side of the barrel, preferably a few degrees below the horizontal with respect to the barrel screen axis X and in any event not more than 10° above the horizontal nor more than 30° below the horizontal. If above 10° above the horizontal, the small potato cuttings would tend to ride up the barrel screen 2; if below 30° below the horizontal, the long potato pieces would slide out the cups 5 instead of being balanced thereby. A cam shaft 13' is journalled within frame 16' and is provided with one or more off-set cams 13 for regulating, by rotation of shaft wheel W, the progressive disposition or spacing of belly plate 12 with respect to the barrel screen 2.

The operation of the machine will now be discussed. A load of potatoes is initially dumped into hopper 35 which in turn conducts the potatoes (or other vegetables) into the interior of barrel screen 2. The barrel screen 2 may have a pair of end rings 42 and also a plate 41 to keep the potatoes from coming out the ends of the barrel screen. The power plant 33 is turned on and barrel 2 commences to rotate. During this rotation the finger means 6 will pick up ones of the potatoes in the load as illustrated in FIGURE 7 and will advance the potatoes toward the cutting blades 8. The spring mounting (see FIGURE 3) of the cutting blade shaft is such that if hard objects come between the barrel sections 2' and the blades 8, the blades 8 will back off so as not to cause damage thereto or to the machine in general.

Finger means 6 will advance the potatoes through the cutting blades 8 so that the potatoes (or potato pieces) will be cut in two. The distance between the fingers of the finger means will be determined so that the smaller pieces of potatoes will not be caught by the finger means 6 and advanced to the cutting means 8.

When the cuttings or pieces are sufficiently small enough, they will drop into the apertures A of the barrel screen at the belly plate area of the machine. (While, obviously, the barrel screen could be of very thick wall dimension, either by a double cylinder arrangement or otherwise, it is obviously best simply to weld the strap cups 5 to the exterior of the barrel screen sections.) Thus, the cups 5 in fact serve as "wiper cups" for advancing the small potato pieces upwardly along the belly plate 12 until its upper edge as delineated by angle iron 14 is reached. Since the edge (14) is preferably somewhat below the horizontal of the machine with respect to the barrel axis (and in any event not greater than 10° above this axis), the small potato cuttings will drop out of their cups 5 and be conducted by hopper plates 18 to the conveyer 20.

It will be observed, however, that long thin potatoes (see P in FIGURE 5) or thin potato cuttings will protrude through their respective apertures A of the barrel screen sections 2' and will be advanced upwardly along the belly plate 12. However, and owing to their length, they will not drop out, by virtue of the fact that the upper edge of the belly plate 12 is sufficiently high enough so that the potatoes will balance, by friction or otherwise, upon the cups 5 and ultimately, when the barrel screen 2 advances sufficiently, drop back into the barrel down to the load area thereof. Thus, these long potatoes or potato cuttings will be subject to further cutting as is desired for obtaining proper potato "seed."

The spacing of belly plate 12 from barrel screen 2 may be selected to be either uniform or of progressively increasing nature as output edge of belly plate 12 is approached, and may be made larger or smaller by the proper, manual rotation of the cam shaft 13' by wheel W. Thus, the device may be adjusted as desired so that long potato or long potato pieces of a particularly chosen size and larger will be returned to the bottom of the barrel by the cup balancing feature of the machine heretofore explained.

Obviously, other means might be employed to rotate the barrel. Likewise, cutting plates of different configurations might also be used.

The cutting fingers themselves are believed to be of importance. It is to be noted at the outset that the several cutting blades 8 are in registry with the spaces 48 between the several barrel sections 2'; further, the finger members 6 are disposed over these spaces 48 and proceed through their respective admittance apertures A'. Thus, the finger means are all in registry with the cutting plates so that the blades pass in between the fingers so as to cut the potatoes contained thereby. Preferably the fingers are curved upwardly (i.e. in a lateral direction with respect to their plane) so as to ensure proper retention.

While particular embodiments of the present invention have been shown and described, it will be obvious to those skilled in the art that changes and modifications may be made without departing from this invention in its broader aspects, and, therefore, the aim in the appended claims is to cover all such changes and modifications as fall within the true spirit and scope of this invention.

I claim:
1. A cutting machine including, in combination, a frame, a barrel screen, means mounting said barrel screen to said frame for enabling the revolvement of said barrel screen about its axis, power means coupled to said barrel screen for revolving said barrel screen, at least one cutting blade, means secured to said frame mounting said cutting blade in stationary disposition, relative to barrel screen revolvement, within and close to said barrel screen, finger means mounted to and disposed within said barrel screen for advancing selected contents within said barrel screen toward said cutting blade, for cutting thereof, a belly plate affixed to said frame and disposed immediately beneath said barrel screen, and means for collecting suitably cut contents of said barrel screen as they are carried upwardly by said barrel screen past said belly plate to drop through said barrel screen and over said belly plate.

2. A cutting machine including, in combination, a frame, a barrel screen, means mounting said barrel screen to said frame for enabling the revolvement of said barrel screen about its axis, power means coupled to said barrel screen for revolving said barrel screen, at least one cutting blade, means secured to said frame mounting said cutting blade in stationary disposition, relative to barrel screen revolvement, within and close to said barrel screen, finger means mounted to said barrel screen for advancing selected contents within said barrel screen toward said cutting blade, for cutting thereof, a belly plate affixed to said frame and disposed immediately beneath said barrel screen, and means for collecting suitably cut contents of said barrel screen as they are carried upwardly by said barrel screen past said belly plate to drop through said barrel screen and over said belly plate, and wherein said barrel screen is provided with a multiplicity of apertures and has a multiplicity of exterior cup means fixedly disposed about at least the lower portion, as defined by barrel screen revolvement, of respective ones of said apertures and in registry therewith.

3. A cutting machine including, in combination, a frame, a barrel screen, means mounting said barrel screen to said frame for enabling the revolvement of said barrel screen about its axis, power means coupled to said barrel screen for revolving said barrel screen, at least one cutting blade, means secured to said frame mounting said cutting blade in stationary disposition, relative to barrel screen revolvement, within and close to said barrel screen, finger means mounted to said barrel screen for advancing selected contents within said barrel screen toward said cutting blade, for cutting thereof, a belly plate affixed to said frame and disposed immediately beneath said barrel screen, and means for collecting suitably cut contents of said barrel screen as they are carried upwardly by said barrel screen past said belly plate to drop through said barrel screen and over said belly plate, and wherein said finger means comprise respective members each having a pair of fingers, and wherein said frame has a cleaning bar disposed within and close to said barrel screen and provided with at least one protuberance disposed in registry with said finger means and passing between said fingers thereof.

4. A cutting machine including, in combination, a frame, a barrel screen, means mounting said barrel screen to said frame for enabling the revolvement of said barrel screen about its axis, power means coupled to said barrel screen for revolving said barrel screen, at least one cutting blade, means secured to said frame mounting said cutting blade in stationary disposition, relative to barrel screen revolvement, within and close to said barrel screen, finger means mounted to said barrel screen for advancing selected contents within said barrel screen toward said cutting blade, for cutting thereof, a belly plate affixed to said frame and disposed immediately beneath said barrel screen, and means for collecting suitably cut contents of said barrel screen as they are carried upwardly by said barrel screen past said belly plate to drop through said barrel screen and over said belly plate, and wherein said barrel screen includes at least two, registered, cylindrical sections spaced apart and provided with marginal, finger admittance apertures, means affixed to but spaced above said sections for securing said sections together, said cutting blade being in registry with the space between said sections, and said finger means comprising U-shaped elements interiorly passing through said finger admittance apertures to extend within said barrel screen and over said space.

5. A cutting machine including, in combination, a frame, a barrel screen, means mounting said barrel screen to said frame for enabling the revolvement of said barrel screen about its axis, power means coupled to said barrel screen for revolving said barrel screen, at least one cutting blade, means secured to said frame mounting said cutting blade in stationary disposition, relative to barrel screen revolvement, within and close to said barrel screen, finger means mounted to said barrel screen for advancing selected contents within said barrel screen toward said cutting blade, for cutting thereof, a belly plate affixed to said frame and disposed immediately beneath said barrel screen, and means for collecting suitably cut contents of said barrel screen as they are carried upwardly by said barrel screen past said belly plate to drop through said barrel screen and over said belly plate, and wherein said finger means comprise respective members each having a pair of fingers curved upwardly in accordance with the direction of revolvement of said barrel screen.

6. Apparatus according to claim 5 wherein said finger means includes protective sleeves respectively disposed about said fingers.

7. A cutting machine including, in combination, a frame, a barrel screen, means mounting said barrel screen to said frame for enabling the revolvement of said barrel screen about its axis, power means coupled to said barrel screen for revolving said barrel screen, at least one cutting blade, means mounting said cutting blade in stationary disposition, relative to barrel screen revolvement, within and close to said barrel screen, finger means mounted to said barrel screen for advancing selected contents within said barrel screen toward said cutting blade, for cutting thereof, and a belly plate affixed to said frame and disposed immediately beneath said barrel screen, said belly plate extending upwardly with respect to said barrel screen, on the up-motion side thereof, to a point not more than 30° below the horizontal nor more than 10° above the horizontal, with respect to the barrel screen axis.

8. In combination, horizontally disposed barrel screen means for receiving contents of various sizes therewithin, said barrel screen means being provided with a multiplicity of aperture means for permitting the passage therethrough, out of said barrel screen means, of smaller items of said contents, frame means for supporting and journalling said barrel screen means for rotation, power means for rotating said barrel screen means coupled thereto, and baffle means fixedly disposed with respect to said frame and disposed exterior of, proximate to but spaced from said barrel screen means for impeding the passage completely through said aperture means of longer items of said contents disposed therein which, by virtue of the smallness of their girth, would otherwise drop out of said barrel screen means through said aperture means, until such longer items reach a height and disposition during the progress of rotation of said barrel screen means such that they will drop by their own weight back into said barrel screen means.

9. Structure according to claim 8 wherein said baffle screen means is arcuate upwardly.

10. Structure according to claim 8 wherein said barrel screen means is provided with a multiplicity of exterior cup means fixedly disposed about at least the lower portion, as defined by barrel screen rotation, of respective ones of said apertures and in registry therewith.

References Cited in the file of this patent

UNITED STATES PATENTS

| | | |
|---|---|---|
| 1,362,396 | Cleveland | Dec. 14, 1920 |
| 1,897,664 | Hansen | Feb. 14, 1933 |
| 1,934,621 | Criner | Nov. 7, 1933 |
| 2,544,275 | Moragne | Mar. 6, 1951 |
| 2,608,045 | Keene | Aug. 26, 1952 |
| 2,616,433 | Anderson | Nov. 4, 1952 |
| 2,693,834 | Frova | Nov. 9, 1954 |
| 2,705,516 | Urschel | Apr. 5, 1955 |
| 2,712,723 | Ryan | July 12, 1955 |

OTHER REFERENCES

FMC Publication, "FMC Bean Declusterer," December 1957.